United States Patent
Bhattacharyya et al.

(10) Patent No.: US 9,256,851 B2
(45) Date of Patent: *Feb. 9, 2016

(54) INTELLIGENT CLONING OF A BUSINESS OBJECT GRAPH

(71) Applicant: International Business Machines Corporation, Armonk, NY (US)

(72) Inventors: Anamitra Bhattacharyya, Chelmsford, MA (US); Alfredo Cortes, London (CA); Fredrik Safstrom, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/058,268

(22) Filed: Oct. 20, 2013

(65) Prior Publication Data

US 2014/0188800 A1 Jul. 3, 2014

Related U.S. Application Data

(63) Continuation of application No. 13/730,725, filed on Dec. 28, 2012.

(51) Int. Cl.
   *G06Q 10/06* (2012.01)
(52) U.S. Cl.
   CPC .................................. *G06Q 10/067* (2013.01)
(58) Field of Classification Search
   CPC ................... G06F 17/30578; G06F 17/30607;
      G06F 12/0811; G06F 17/30; G06F 173/30864;
      G06F 9/30087; G06F 9/3834; G06F 9/44563;
      G06F 9/466; G06F 9/5066
   USPC .......... 711/E12.009, E12.001, 154, 162, 170,
      711/E12.002, E12.017, E12.103, E12.011,
      711/E12.022, 115, 118, 122, 128, 135, 141,
      711/159; 707/E17.055, 999.102, E17.001,
      707/E17.005, E17.044, 999.206, E17.002,
      707/E17.009, 639, 792, 999.1, 798, 816,
      707/999.01, 999.204, E17.007, E17.008,
      707/E17.01, E17.011, E17.014, E17.017,
      707/E17.032, E17.056, E17.108, E17.118,
      707/E17.131, 600, 608, 611, 616, 625, 661,
      707/695, 703, 713, 737, 752, 758, 781, 803,
      707/813, 818, 820, 999.003, 999.005,
      707/999.007, 999.103, 999.104, 999.201;
      715/234, 764, 701, 738, 770, 771, 852;
      709/219, 208, 209, 220, 223, 226, 228,
      709/234, 764, 701, 738, 770, 771, 852
   See application file for complete search history.

(56) References Cited

U.S. PATENT DOCUMENTS

| | | | | |
|---|---|---|---|---|
| 2006/0101446 A1* | 5/2006 | Mariani et al. | ................ | 717/166 |
| 2008/0320486 A1* | 12/2008 | Bose et al. | .................... | 718/105 |
| 2009/0112908 A1* | 4/2009 | Wintel et al. | ................. | 707/102 |

*Primary Examiner* — Jay Morrison
*Assistant Examiner* — Ken Hoang
(74) *Attorney, Agent, or Firm* — Steven M. Greenberg, Esq.; CRGO Law

(57) ABSTRACT

Embodiments of the present invention provide a method, system and computer program product for context sensitive cloning of a business object graph. In an embodiment of the invention, a method for context sensitive cloning of a business object graph is provided. The method includes selecting a business object of an application executing in memory of a computer for cloning and ascertaining a contemporaneous state of the selected business object. The method also includes applying a cloning rule to the state of the selected business object to determine a business object graph from amongst a set of pre-determined business object graphs to be used when cloning the selected business object. Finally, the method includes cloning the determined business object graph in the memory of the computer.

4 Claims, 2 Drawing Sheets

INTELLIGENT CLONING OF A BUSINESS OBJECT GRAPH

CROSS-REFERENCE TO RELATED APPLICATIONS

This application is a Continuation of U.S. application Ser. No. 13/730,725, filed Dec. 28, 2012, the entirety of which is incorporated herein by reference.

BACKGROUND OF THE INVENTION

1. Field of the Invention

The present invention relates to business object management and more particularly to business object cloning.

2. Description of the Related Art

A business object is a type of an intelligible entity being an actor inside the business layer in an n-layered architecture of object-oriented computer programs. A business object generally includes no logic, but merely a set of instance variables or properties, often referred to as attributes, as well as associations with other business objects. Therefore, a collection of different business objects which reference one another in some way can result in a business object graph of different business objects representative of business relationships of people, processes and products within a single organization, between different organizations, or both.

Oftentimes, it is desirable to copy a business object for use a copied entity separate from the original business object. For instance, in many cases it can be desirable to duplicate a business object and then manipulate attributes of the duplicated business object without affecting the original business object. To effectuate a copy, the attributes of the business object are copied to a different object of the same data type. The act of copying, also known as cloning or replicating, can vary from merely duplicating all of the attributes of the source business object into a target business object, or in a more complex operation, duplicating not only the attributes of the source object, but also all referenced business objects and the attributes corresponding to the referenced objects. The former operation is referred to as a "shallow" clone while the latter is referred as a "deep" clone of the entire business object graph.

With respect to a shallow copy, only basic utilization of the business object is possible as those business objects referenced by the shallow clone of the business object are not likewise duplicated and thus remain inaccessible to the shallow clone of the business object. However, with respect to a deeply cloned business object graph, all business objects referenced by others of the graph can be accessed. For instance, in a deep cloning operation, the business objects of the graph can be serialized, provided as a byte stream and de-serialized in a target memory space so as to produce a perfect copy of the business object graph. Yet, as it will be apparent, performing a deep clone of a business object graph can be computing resource consumptive, while a shallow clone of a business object can be relatively efficient.

Presently, the determination of whether or not business objects in a business object graph are to be subjected to shallow cloning or deep cloning occurs statically prior to run time. Once that determination has been made, at run time the selection of shallow cloning or deep cloning is fixed. Further, when executing a cloning operation, embedded processing logic in the application often accounts for the contemporaneous state of the source business object in order to generate a target business object graph. The contemporaneous state can include, for instance, a valid status or a security level, and can be dispositive of the number of related business objects to be included in the target business object graph and the relationship therebetween. However, given the sensitive nature of some attributes of the source business object or the relevance of those attributes to the cloned business object such as the creation date of the source business object or its unique identifier, often only a cloning of a partial state of the business object graph is desired.

BRIEF SUMMARY OF THE INVENTION

Embodiments of the present invention address deficiencies of the art in respect to business object graph cloning and provide a novel and non-obvious method, system and computer program product for context sensitive cloning of a business object graph. In an embodiment of the invention, a method for context sensitive cloning of a business object graph is provided. The method includes selecting a business object of an application executing in memory of a computer for cloning and ascertaining a contemporaneous state of the selected business object. The method also includes applying a cloning rule to the state of the selected business object to determine a business object graph from amongst a set of pre-determined business object graphs to be used when cloning the selected business object. Finally, the method includes cloning the determined business object graph in the memory of the computer.

In one aspect of the embodiment, the determined business object graph is a default business object graph not linked to any particular business object state. In another aspect of the embodiment, business objects included as part of the determined business object graph and not already loaded in the memory are loaded into memory prior to cloning. In yet another aspect of the embodiment, the determined business object graph includes a partial set of attributes of included business objects with some attributes of the business objects excluded.

In another embodiment of the invention, a business object data processing system is configured for context sensitive cloning of a business object graph. The system includes a host computing system that includes at least one computer with memory and at least one processor. The system also includes an application executing in the memory of the host computing system and utilizing different business objects stored in a business object data store. Finally, the system includes a contextual cloning module coupled to the application. The module includes program code enabled to select a business object of the application, ascertain a contemporaneous state of the selected business object, apply a cloning rule to the state of the selected business object to determine a business object graph from amongst a set of pre-determined business object graphs to be used when cloning the selected business object, and clone the determined business object graph in the memory of the computer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
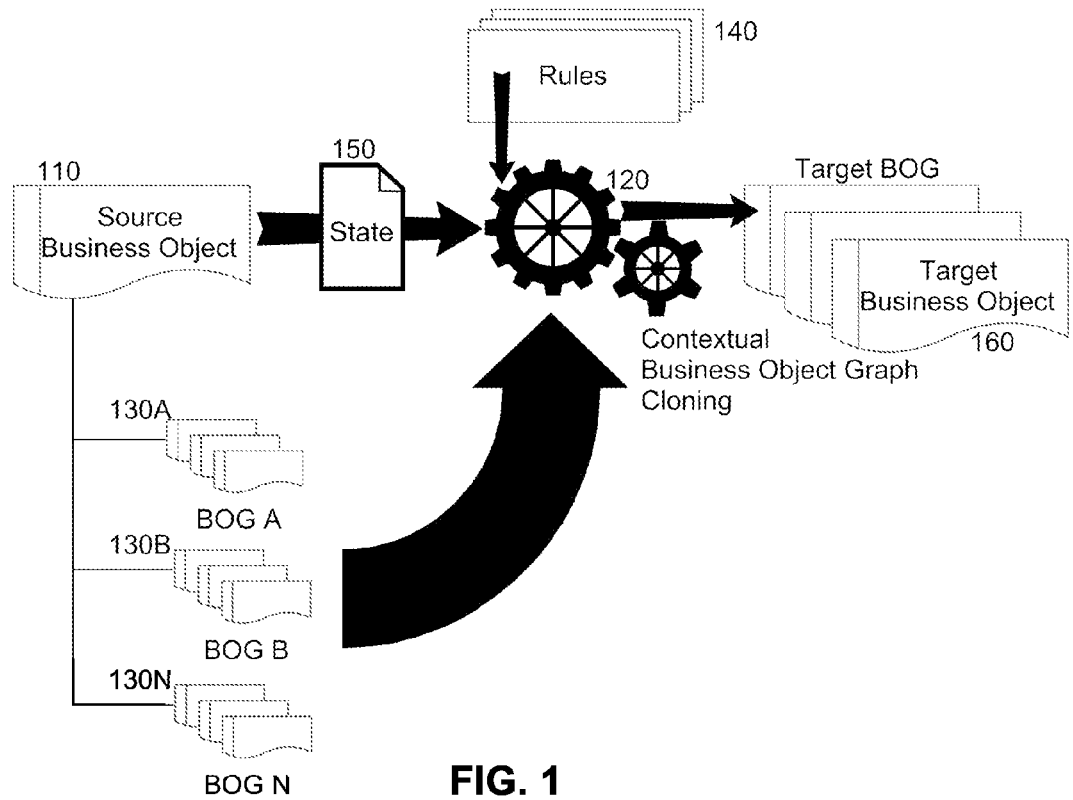
FIG. 1 is a pictorial illustration of a process for context sensitive cloning of a business object graph.

Embodiments of the invention provide for context sensitive cloning of a business object graph. In accordance with an embodiment of the invention, responsive to the receipt of a request to clone a source business object, a contemporaneous state of the source business object can be determined and a rule applied to identify a business object graph associated with the contemporaneous state. Thereafter, the identified business object graph can be cloned to the target business object graph and returned to the requestor. To the extent that new rule applies to the contemporaneous state, a default business object graph can be cloned. Further, to the extent that any business object in the identified business object graph has not yet been loaded into memory, those of the unloaded business objects in the identified business object graph can be loaded prior to cloning the identified business object graph to the target business object graph. In further illustration, FIG. 1 is a pictorial illustration of a process for context sensitive cloning of a business object graph. As shown in FIG. 1, contextual business object graph cloning logic 120 can clone a source business object 110 into a target business object graph 160 utilizing any range of business objects related to the source business object 110 depending upon a state 150 of the source business object 110. In this regard, the source business object 110 once selected for cloning can be analyzed to ascertain a contemporaneous state 150.

Thereafter, one or more rules 140 can be applied to the contemporaneous state 150 to determine one of several pre-determined business object graphs 130A, 130B, 130N to be cloned into the target business object graph 160. The application of the one or more rules 140 further can determine a selection of one or more attributes of each business object in the determined one of the several predetermined business object graphs 130A, 130B, 130N to be included in the target business object graph 160. Alternatively, the application of the one or more rules 140 can determine a selection of one or more attributes of each business object in the determined one of the several business object graphs 130A, 130B, 130N to be excluded from the target business object graph 160. In either circumstance, to the extent that a business object in the determined one of the several business object graphs 130A, 130B, 130N is not loaded and thus available for cloning into the target business object graph 160, the business objects of the determined one of the several business object graphs 130A, 130B, 130N that are unloaded can be loaded prior to cloning.

Figure 2:
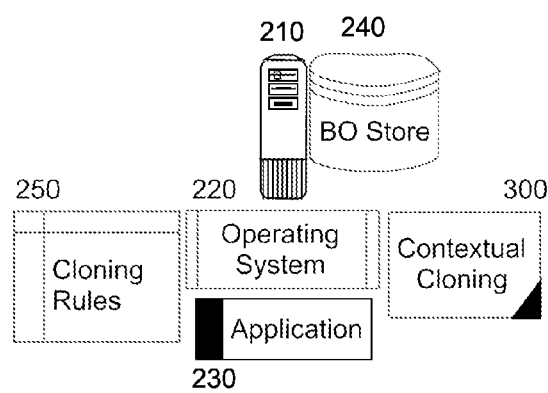
FIG. 2 is a schematic illustration of a business object data processing system configured for context sensitive cloning of a business object graph; and, FIG. 3 is a flow chart illustrating a process for context sensitive cloning of a business object graph.

The process described in connection with the illustration of FIG. 1 can be implemented within a business object data processing system. In yet further illustration, FIG. 2 schematically shows a business object data processing system configured for context sensitive cloning of a business object graph. The system can include a host computing system 210 that can include one or more server computers each with one or more processors and memory (only a single server computer shown for the purpose of illustrative simplicity). The host computing system 210 can include an operating system 220 executing thereon and hosting the operation of an application 230 reliant upon multiple different interrelated business objects disposed within a business object data store 240.

Of note, a contextual cloning module 300 can be coupled to the application 230 and can execute in the memory of the host computing system 210. The contextual cloning module 300 can include program code that when executed by the host computing system 210 can be enabled to select a business object loaded in memory of the host computing system 210 for cloning. The program code of the contextual cloning module 300 additionally can be enabled to ascertain a contemporaneous state of the selected business object and can apply cloning rules 250 to the contemporaneous state in order to identify a pre-determined business object graph of business objects and corresponding attributes to be cloned, or in the alternative, to identify a default business object graph and corresponding attributes to be cloned if no particular pre-determined business object graph is specified by the cloning rules 250. Finally, the program code of the contextual cloning module 300 can be enabled to clone into a target business object graph the identified business object graph, or the default business object graph as the case may be.

Figure 3:
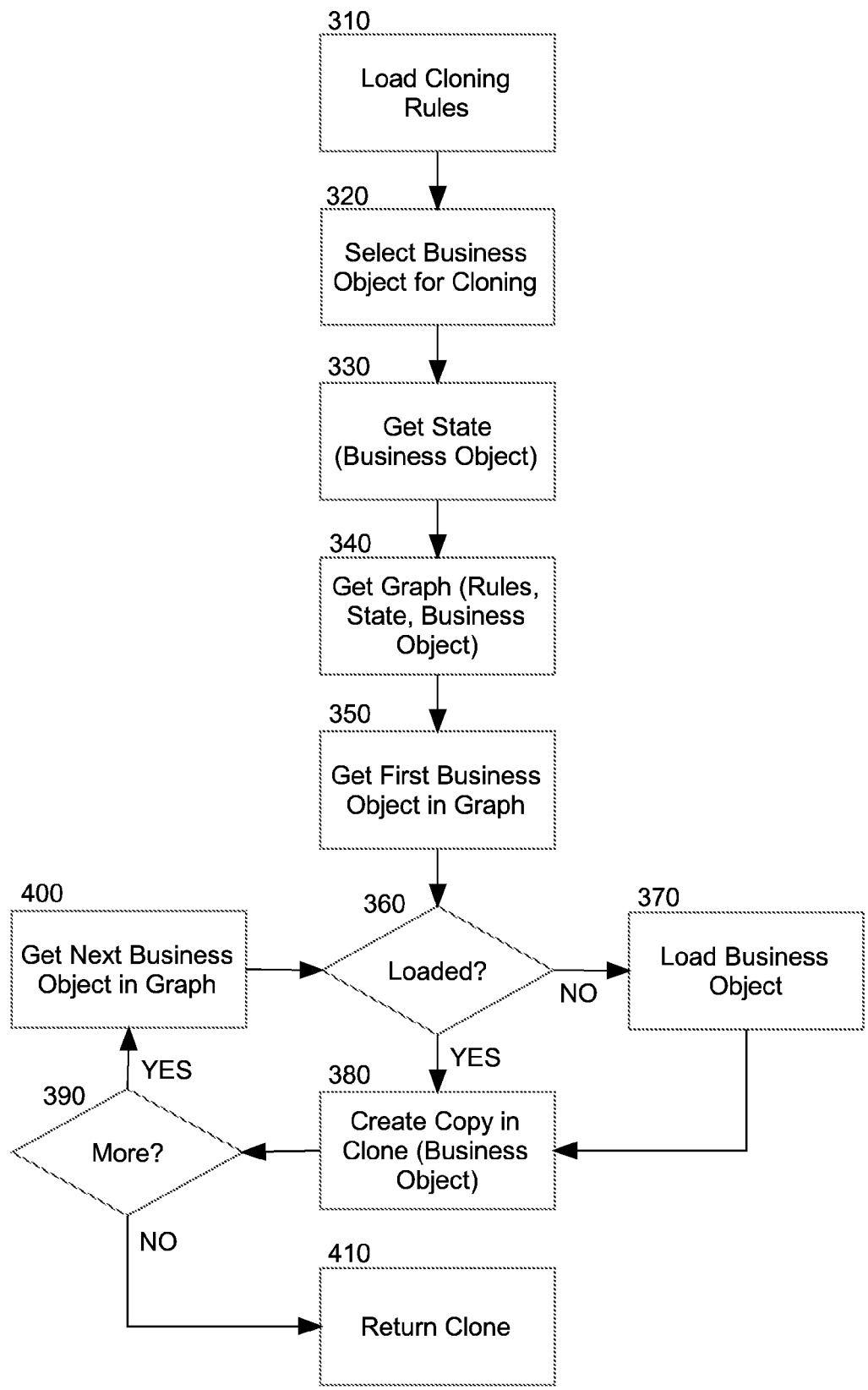

In even yet further illustration of the operation of the contextual cloning module 300, FIG. 3 is a flow chart illustrating a process for context sensitive cloning of a business object graph. Beginning in block 310, a set of cloning rules can be loaded for application to a selected business object and its ascertained contemporaneous state. In block 320, a business object can be selected for cloning and in block 330, the state of the business object can be ascertained. Thereafter, in block 340, a pre-determined business object graph, or a default business object graph can be determined in consequence of the application of the loaded cloning rules to the contemporaneous state of the selected business object.

In block 350, a first business object in the determined business object graph can be selected for cloning and in decision block 360, it can be determined whether or not the selected business object is loaded in memory. If not, in block 370 the selected business object can be loaded into memory. Subsequently, in block 380 the selected business object can be cloned into a target business object graph. In decision block 390 it can be determined whether or not additional business objects in the determined business object graph remain to be cloned. If so, in block 400 the next business object in the determined business object graph can be selected and the process can repeat through decision block 360. When no further business objects in the determined business object graph remain, in block 410 the target can be returned as a clone to the selected business object.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for context sensitive cloning of a business object graph, the method comprising:
   selecting a business object of an application executing in memory of a computer for cloning;

ascertaining a contemporaneous state of the selected business object;

applying a cloning rule to the state of the selected business object to determine a business object graph from amongst a set of pre-determined business object graphs to be used when cloning the selected business object, but to use a default business object graph and corresponding attributes when cloning the selected business object if no particular pre-determined business object graph is determined from the cloning rules; and, cloning one or more business objects in the determined business object graph into a target business object graph in the memory of the computer.

2. The method of claim 1, wherein the determined business object graph is a default business object graph not linked to any particular business object state.

3. The method of claim 1, further comprising loading into memory prior to cloning business objects included as part of the determined business object graph and not already loaded in the memory.

4. The method of claim 1, wherein the determined business object graph includes a partial set of attributes of included business objects with some attributes of the business objects excluded.

* * * * *